United States Patent
Kumagai et al.

(10) Patent No.: US 7,103,673 B2
(45) Date of Patent: Sep. 5, 2006

(54) SYSTEM FOR TRANSMITTING RESERVATION DATA AND COMPLETING THE TRANSMISSION BY TRANSMISSION COMPLETION TIME

(75) Inventors: Naoko Kumagai, Tokyo (JP); Hiroki Kotani, Tokyo (JP)

(73) Assignee: Sony Corporation, Tokyo (JP)

( * ) Notice: Subject to any disclaimer, the term of this patent is extended or adjusted under 35 U.S.C. 154(b) by 951 days.

(21) Appl. No.: 09/789,418

(22) Filed: Feb. 20, 2001

(65) Prior Publication Data

US 2001/0034789 A1 Oct. 25, 2001

(30) Foreign Application Priority Data

Feb. 18, 2000 (JP) .......................... P2000-046841

(51) Int. Cl.
 *G06F 15/16* (2006.01)
(52) U.S. Cl. ....................................... 709/233; 709/232
(58) Field of Classification Search ................ 709/232, 709/224, 228, 229, 233; 370/468, 337, 360, 370/355

See application file for complete search history.

(56) References Cited

U.S. PATENT DOCUMENTS 5,065,393 A * 11/1991 Sibbitt et al. ............... 370/360
5,732,078 A * 3/1998 Arango ....................... 370/355
5,812,545 A * 9/1998 Liebowitz et al. ........... 370/337
5,907,556 A * 5/1999 Hisanaga et al. ........... 370/468
5,920,701 A * 7/1999 Miller et al. ................. 709/228
6,003,086 A * 12/1999 Mitsutake et al. ........... 709/229
6,502,131 B1 * 12/2002 Vaid et al. ................... 709/224

FOREIGN PATENT DOCUMENTS

EP          0 936 788 A1    8/1999
GB          2 307 138 S     4/1997

* cited by examiner

*Primary Examiner*—Le Hien Luu
(74) *Attorney, Agent, or Firm*—Bell, Boyd Lloyd LLC (57) ABSTRACT

An ATM I/F for transmitting data to a data transmission destination via a communication network, a data transmission server, and a data transmission managing device for calculating a network necessary for data transmission on the basis of the data quantity of the data to be transmitted and the transmission completion time indicating the time of completion of data transmission to the data transmission destination are provided. Accounting information is generated on the basis of the calculated network band and transmission time. The data is transmitted to the data transmission destination by using the calculated network band. The data transmission to the data transmission destination is completed by the transmission completion time, and accounting information is generated. Thus, when transmitting data via the communication network, the data transmission completion time is designated in advance for data transmission.

13 Claims, 7 Drawing Sheets

BASIC FEE TABLE

| NETWORK BAND \ TRANSMISSION TIME | PREMIUM EXPRESS SERVICE WITHIN 10 MIN | EXPRESS SERVICE WITHIN 30 MIN | STANDARD SERVICE WITHIN 1 HOUR | ECONOMY SERVICE WITHIN HALF DAY |
|---|---|---|---|---|
| ~100M | 4000 YEN | 3000 YEN | 2000 YEN | 1000 YEN |
| 100M~500M | 8000 YEN | 6000 YEN | 4000 YEN | 2000 YEN |
| 500M~1G | 15000 YEN | 12000 YEN | 10000 YEN | 8000 YEN |

FIG.5A

FORMAT CONVERSION FEE

JPEG→MPEG    2000 YEN
DV   →MPEG    1000 YEN
SD   →HD        5000 YEN
    . . .

SYSTEM FOR TRANSMITTING RESERVATION DATA AND COMPLETING THE TRANSMISSION BY TRANSMISSION COMPLETION TIME

BACKGROUND OF THE INVENTION

1. Field of the Invention

The present invention relates to a data transmitting device and method, as well as to a data transmission managing device and method in which the time of completion of data transmission is designated to a data transmission destination for transmitting data via a network.

2. Description of the Related Art

Conventionally, there has been a data transmission system for transmitting data such as files and streams, in which a fixed network band is rented for a fixed amount of fee so as to transmit data. In this data transmission system, data transmission is carried out within the range of the network band that is rented in advance.

Also in the conventional data transmission system, accounting is carried out in accordance with the quantity of transmission data that is used. In this data transmission system, in most cases, an accounting server is provided in the network and the transmission state of the network is monitored by the accounting server, thereby requesting the data transmission side for accounting.

In the foregoing data transmission system, when data is transmitted from the data transmission side, it is often the case that the data transmission completion time on the data receiving side cannot be known.

Moreover, in the conventional data transmission system, it is often the case that the data transmission side cannot designate the data reaching time at the data receiving side. Specifically, in the data transmission system, in the case where the network band rented for a fixed amount of fee is occupied by another user, data transmission cannot be started and the time of completion of data transmission on the data receiving side cannot be designated.

Thus, in view of the foregoing status of the prior art, it is an object of the present invention to provide a data transmitting device and method and a data transmission managing device and method which enable data designation of the data transmission completion time in advance so as to carry out data transmission.

SUMMARY OF THE INVENTION

Accordingly, the data transmitting device according of the present invention includes a data transmitting part for transmitting data to a data transmission destination via an external communication channel; a data storage part for storing the data transmitted by the data transmitting part; arithmetic part for calculating a network band necessary when the data transmitting part transmits the data, on the basis of the data quantity of the data stored in the data storage part and transmitted by data transmitting part and the transmission completion time indicating the time of completion of data transmission to the data transmission destination; an accounting part for generating accounting information on the basis of the network band calculated by the arithmetic part and the transmission time at the data transmitting part; and a transmission control part for controlling the data transmitting part to transmit the data stored in the data storage part to the data transmission destination by using the network band calculated by the arithmetic part and to complete the data transmission to the data transmission destination by the transmission completion time, and for controlling the accounting part to generate the accounting information.

A data transmitting method according to the present invention includes the steps of: calculating a network band necessary for transmitting data on the basis of the data quantity of data transmitted to a data transmission destination and the transmission completion time indicating the time of completion of data transmission to the data transmission destination; transmitting stored data to the data transmission destination by using the calculated network band; and generating accounting information on the basis of the network band and the transmission time.

A data transmission managing device according to the present invention includes a communication part connected with a data transmitting device and a data receiving device via a communication channel; a communication control part for securing a network band for the communication part on the basis of a request from the data transmitting device which secures a network band necessary for transmitting data to the data receiving device; and an arithmetic part for controlling the communication part to generate accounting information, on the basis of the network band determined from the data quantity of the data transmitted from the data transmitting device to the data receiving device and the transmission completion time indicating the time of completion of data transmission to the data transmitting device, and the transmission time when the data is transmitted from the data transmitting device to the data receiving device by using the network band, and to transmit the accounting information to the data transmitting device.

A data transmission managing method according to the present invention includes the steps of: securing a network band on the basis of a request to secure a network band necessary for transmitting data from a data transmitting device to a data receiving device; and generating accounting information on the basis of the network band determined from the data quantity of the data transmitted from the data transmitting device to the data receiving device and the transmission completion time indicating the time of completion of data transmission to the data transmitting device, and the transmission time when the data is transmitted from the data transmitting device to the data receiving device by using the network band.

Additional features and advantages of the present invention are, and will be apparent from, the Detailed Description of the Preferred Embodiments and the Drawings.

DETAILED DESCRIPTION OF THE PREFERRED EMBODIMENTS

Figure 1:
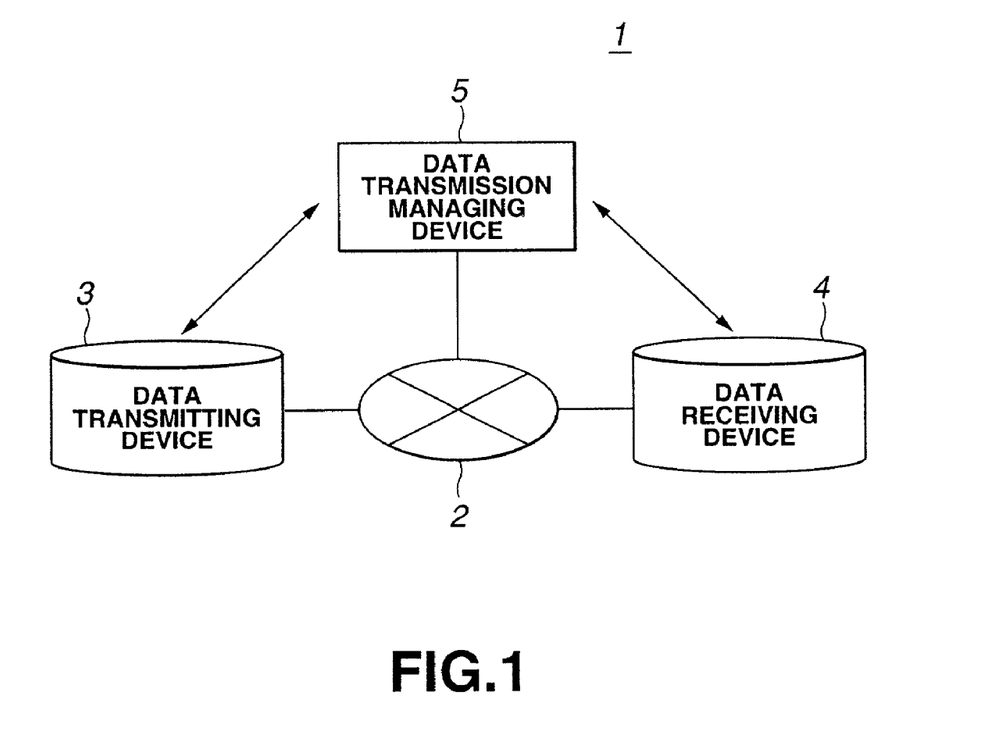
FIG. 1 is a block diagram showing the structure of a data transmission system according to the present invention.

The present invention is applied to, for example, a data transmission system 1 as shown in FIG. 1. The data transmission system 1 includes a data transmitting device 3 for transmitting data via a communication network 2, a data receiving device 4 for receiving the data transmitted from the data transmitting device 3, and a data transmission managing device 5 for managing transmission of data. In this data transmission system 1, with the network management carried out by the data transmission managing device 5, data such as images and music held by the data transmitting device 3 are transmitted to the data receiving device 4, and editing is carried out on the side of the data receiving device 4.

Figure 2:
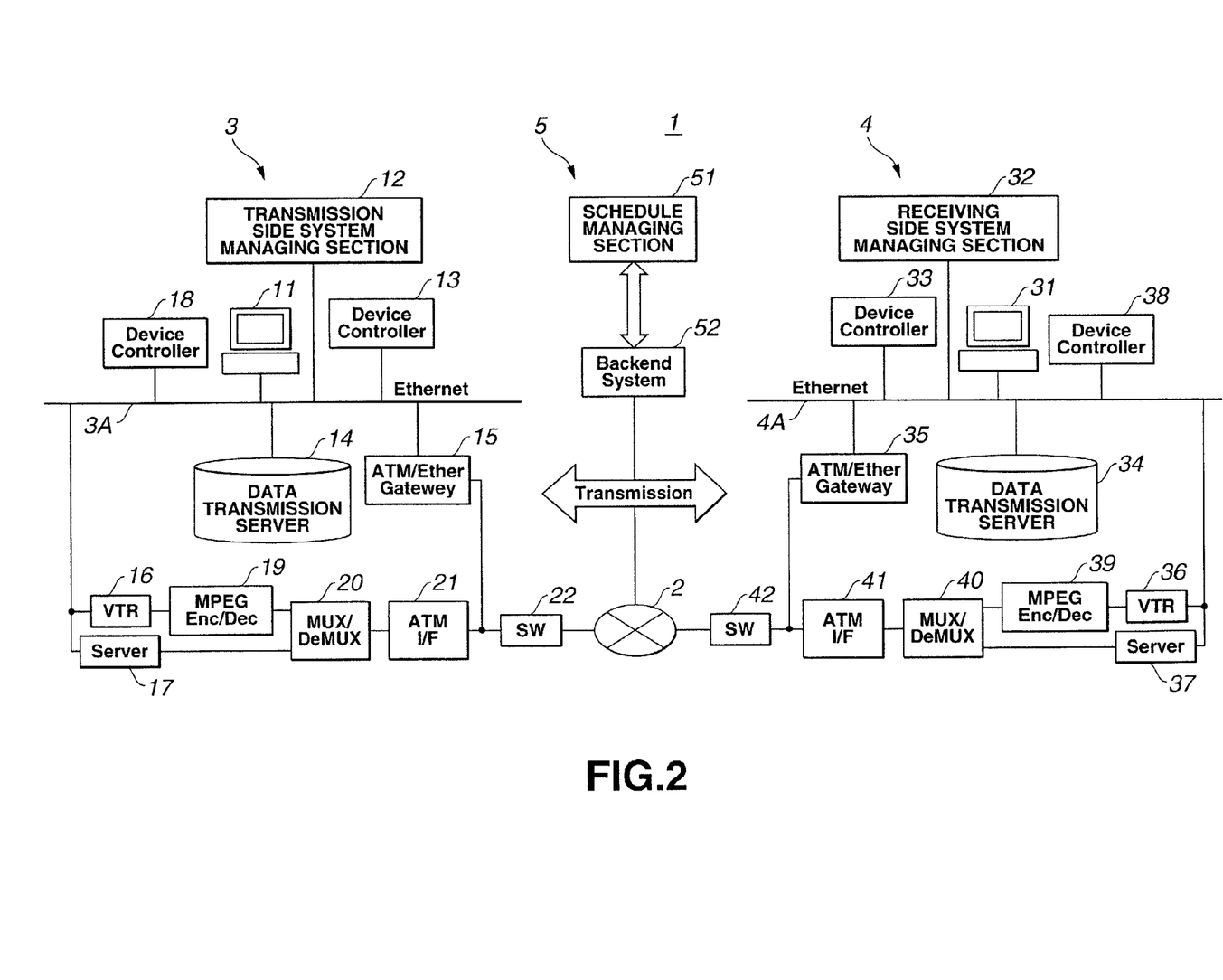
FIG. 2 is a block diagram showing the structure of a data transmitting device, a data receiving device and a data transmission managing device, which constitute the data transmission system according to the present invention.

The data transmission system 1 has a structure as shown in FIG. 2. In the data transmission system 1, LANs (local area networks) are constituted within the data transmitting device 3 and the data receiving device 4, and the data transmitting device 3 and the data receiving device 4 are connected with each other via the communication network 2 and the data transmission managing device 5, thus constituting a WAN (wide area network) system.

In the data transmitting device 3, a user terminal 11, a transmission side system managing section 12, a device controller 13, a data transmission server 14, a gateway 15, a VTR (video tape recorder) unit 16, a server unit 17 and a device controller 18 are connected to a data bus 3A, thus constituting the LAN. The data transmitting device 3 is constituted by, for example, a LAN of a system in conformity with the Ethernet.

The data transmitting device 3 also has an MPEG (Moving Picture Experts Group) encoder/decoder 19 connected to the VTR unit 16, a multiplexer/demultiplexer 20 connected to the MPEG encoder/decoder 19 and the server unit 17, an ATM (asynchronous transfer mode) I/F 21, and a switch 22.

The user terminal 11 is made up of, for example, a personal computer operated by a user. As the user operates its keyboard and mouse, the user terminal 11 designates a material as a transmission object such as an image, music or data stored in the data transmission server 14 or the like. The user terminal 11 designates the data transmission destination in accordance with the operation by the user. Moreover, the user terminal 11 designates the transmission completion time of designated transmission data in accordance with the operation by the user. Furthermore, the user terminal 11 can designate the transmission start time.

The user terminal 11 generates a reservation request on the basis of various information designated by the operation by the user, and outputs the reservation request to the transmission side system managing section 12 via the data bus 3A.

The gateway 15 transforms the data structure between the data format in the communication network 2 and the data format in the data transmitting device 3. Specifically, the gateway 15 carries out conversion processing between the packet format conformable to the Ethernet and the packet format conformable to the ATM system. The gateway 15 converts a packet conformable to the Ethernet to a packet conformable to the ATM system when transmitting data from the data transmitting device 3 to the data receiving device 4, and converts a packet conformable to the ATM system to a packet conformable to the Ethernet when receiving data from the communication network 2.

The device controller 13 supplies a control signal to the gateway 15, thereby controlling its operation, and also holds and manages the reservation status of the gateway 15. The device controller 13 manages the reservation status for the operation of the gateway 15 in accordance with a resource securing request designated from the transmission side system managing section 12. When the transmission start time designated by the transmission side system managing section 12 is reached, the device controller 13 controls the gateway 15 to operate.

The device controller 13 outputs the on/off state of the power of the gateway 15 and whether the gateway 15 normally operates or not, as the operation state, to the transmission side system managing section 12, and also outputs the reservation status of the gateway 15 to the transmission side system managing section 12.

The data transmission server 14 stores data to be transmitted from the data transmitting device 3 to the data receiving device 4 and manages the stored data. The data transmission server 14 outputs the data volume of data designated by the user terminal 11 to the transmission side system managing section 12.

The VTR unit 16 is made up of a streamer having data recorded on a tape-like recording medium, and is controlled by the device controller 18 to output the stored data to the MPEG encoder/decoder 19. In the VTR unit 16, for example, data compressed in accordance with the MPEG system is recorded.

The server unit 17 stores data and manages the stored data. When transmitting data to the communication network 2, the server unit 17 outputs the data to the multiplexer/demultiplexer 20.

The device controller 18 supplies a control signal to the VTR unit 16 and the server unit 17, thus controlling their operation, and also holds and manages the reservation status of the VTR unit 16 and the server unit 17. The device controller 18 manages the reservation status for the operation of the VTR unit 16 and the server unit 17 in response to a resource securing request from the transmission side system managing section 12. When the transmission start time designated by the transmission side system managing section 12 is reached, the device controller 18 controls the VTR unit 16 and the server unit 17 to operate.

The MPEG encoder/decoder 19 encodes data from the VTR unit 16 and outputs the encoded data to the multiplexer/demultiplexer 20. The MPEG encoder/decoder 19 also decodes data from the multiplexer/demultiplexer 20 and outputs the decoded data to the VTR unit 16.

When transmitting data from the MPEG encoder/decoder 19 or the server unit 17, the multiplexer/demultiplexer 20 multiplexes the data and outputs the multiplexed data to the ATM I/F 21. When data from the communication network 2 is transmitted, the multiplexer/demultiplexer 20 demultiplexes the data and outputs the demultiplexed data to the server unit 17.

The ATM I/F 21 converts data from the multiplexer/demultiplexer 20 to a packet conformable to the ATM system and outputs it to the switch 22. Also, the ATM I/F 21 converts data from the switch 22 to a data structure format used in the data transmitting device 3 and outputs it to the multiplexer/demultiplexer 20.

The switch 22 functions as a packet switching system between the data transmitting device 3 and the communication network 2. The switch 22 switches transmission of data from the gateway 15 to the communication network 2 and transmission of data from the ATM I/F 21 to the communication network 2.

The transmission side system managing section 12 calculates a network band for transmitting data to the data receiving device 4 via the communication network 2, on the basis of a reservation request from the user terminal 11. The transmission side system managing section 12 obtains the transmission start time indicating the time to start each equipment and start data transmission, on the basis of the transmission completion time and the network band.

The transmission side system managing section 12 determines whether or not each piece of equipment is operable from the transmission start time included in the data transmitting device 3 until completion of data transmission, with reference to the reservation status of each equipment included in the data transmitting device 3, held by the device controller 13 and the device controller 18. On the basis of the result of determination, the transmission side system managing section 12 outputs a resource securing request to the device controller 13 and the device controller 18. The transmission side system managing section 12 secures a resource for transmitting data in accordance with the response to the resource securing request.

The transmission side system managing section 12 transmits necessary band information of the calculated network band and a resource securing request for requesting securing of resources included in the data receiving device 4 and the data transmission managing device 5 to the data transmission managing device 5.

In such a data transmitting device 3, when transmitting data stored in the data transmission server 14, a resource securing request can be issued which request that the internal equipments operate from the transmission start time until completion of data transmission in accordance with a reservation request from the user terminal 11. Therefore, data transmission can be completed by the transmission completion time.

Also, in the data transmitting device 3, resources in the data transmission managing device 5 and the data receiving device 4 are secured, and data is transmitted by using a network band in accordance with a reservation request, thus completing data reception at the data receiving device 4 by the designated transmission completion time.

Moreover, in the data transmitting device 3, even when transmitting data stored in the VTR unit 16 and the server unit 17 to the data receiving device 4, resources are reserved and then the data is transmitted to the data receiving device 4.

The data receiving device 4 has a structure similar to that of the above-described data transmitting device 3. In the data receiving device 4, a user terminal 31, a receiving side system managing section 32, a device controller 33, a data transmission server 34, a gateway 35, a VTR unit 36, a server unit 37 and a device controller 38 are connected to a data bus 4A, thus constituting a LAN. The data receiving device 4 is constituted by, for example, a LAN of a system conformable to the Ethernet. The data receiving device 4 also has an MPEG encoder/decoder 39 connected to the VTR unit 36, a multiplexer/demultiplexer 40 connected to the MPEG encoder/decoder 39 and the server unit 37, an ATM I/F 41, and a switch 42.

In such a data receiving device 4, the receiving side system managing section 32 determines whether resources (equipments) included in the data receiving device 4 are operable or not when receiving data, with reference to the reservation status of each equipment included in the data receiving device 4, transmitted from the device controller 33 and the device controller 38. On the basis of the result of determination and a resource securing request from the data transmission managing device 5, the receiving side system managing section 32 issues a resource securing request to the device controller 33 and the device controller 38, thereby securing resources for receiving data.

Also, the receiving side system managing section 32 determines whether the network requested by the data transmitting device 3 can be secured or not on the basis of the resource securing request from the data transmission managing device 5, and sends a response to the data transmission managing device 5.

In such a data receiving device 4, when data is transmitted from the data transmitting device 3, the data is stored into the data transmission server 34 via the switch 42 and the gateway 35, thereby completing reception. In the data receiving device 4, the data from the data transmitting device 3 may be received at the VTR unit 36 or the server unit 37 by using the ATM I/F 41, the multiplexer/demultiplexer 40 and the MPEG encoder/decoder 39.

The data transmission managing device 5 manages the states of the data transmitting device 3, the data receiving device 4, and the communication network 2. The data transmission managing device 5 is constituted by a schedule managing section 51 and a back end system 52.

The band end system 52 has a function to transmit and receive data that is handled by the data transmission managing device connected to the communication network 2. The back end system 52 is controlled by the schedule managing section 51, thus transmitting and receiving data.

The schedule managing section 51 monitors the operation status of the back end system 52 and determines whether resources for transmitting data from the data transmitting device 3 to the data receiving device 4 can be secured or not. The schedule managing section 51 determines whether resources can be secured or not on the basis of a reservation request from the data transmitting device 3.

Also, the schedule managing section 51 manages the schedule of the data transmitting device 3 and the data receiving device 4 on the basis of information indicating the reservation status of resources in the data transmitting device 3 and information indicating the reservation status of resources in the data receiving device 4.

The schedule managing section 51 calculates the transmission start time and the necessary network band which enable reception of data at the data receiving device 4 by the transmission completion time designated by the reservation request, on the basis of the material to be transmitted from the transmission side system managing section 12 of the data transmitting device 3, the information indicating the data transmission destination, and the reservation status of the resources constituting the data transmitting device 3. On the basis of the transmission start time and the network band thus calculated, the schedule managing section 51 secures the network band in the circuit from the data transmission managing device 5 to the data transmitting device 3 and in the circuit from the data transmission managing device 5 to the data receiving device 4.

Figure 3:
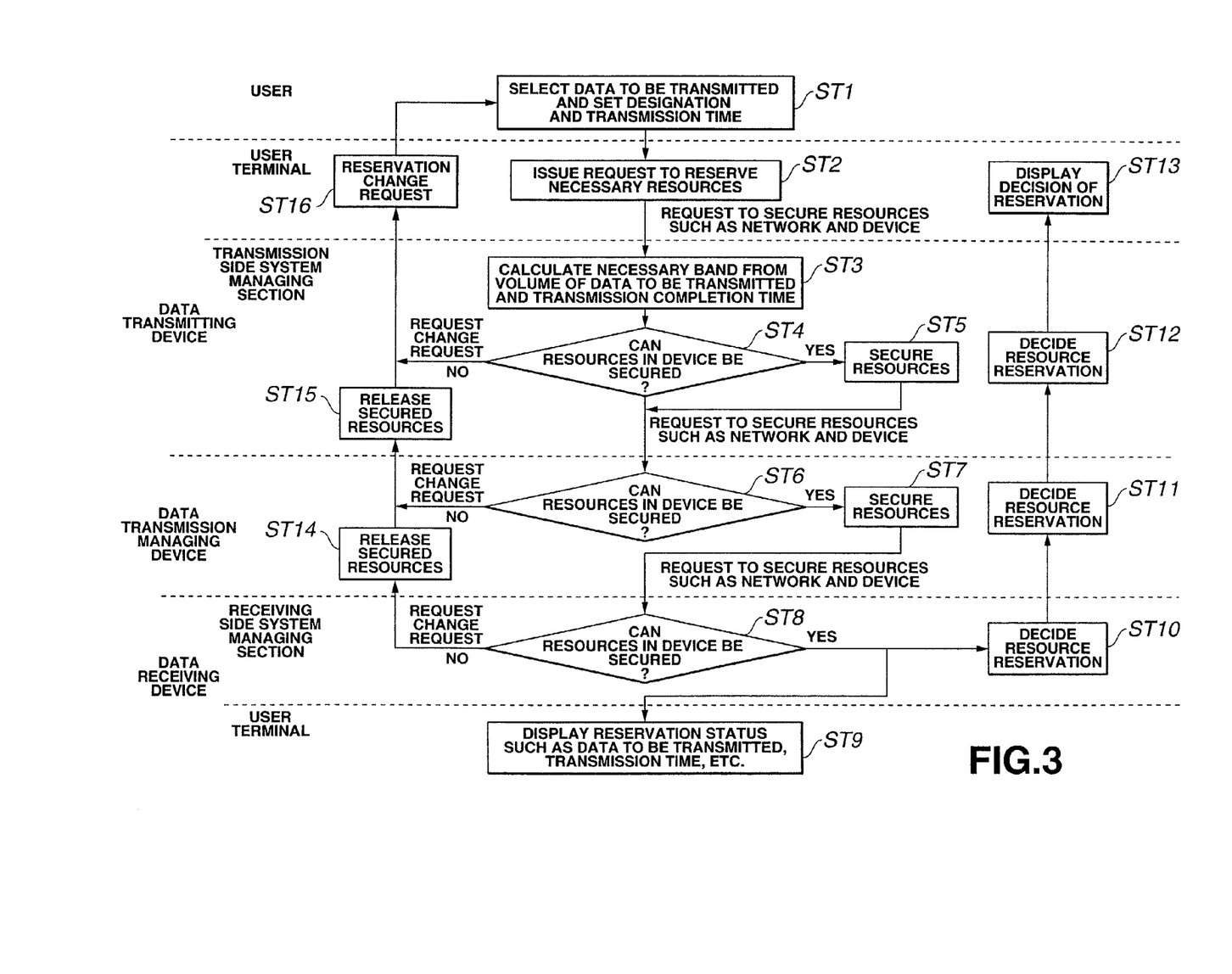
FIG. 3 is a flowchart for explaining the processing procedure for securing resources of the data transmitting device, the data receiving device and the data transmission managing device when transmitting data from the data transmitting device to the data receiving device.

An example of the processing procedure for securing the resources in the data transmitting device 3, the data receiving device 4 and the data transmission managing device 5 in transmitting data from the data transmitting device 3 to the data receiving device 4 will now be described with reference to the flowchart of FIG. 3.

First, at step ST1, as the user terminal 11 is operated by the user, selection of data to be transmitted and designation of the data transmission destination and the transmission completion time are carried out. In this case, the data transmission destination is the above-described data receiving device 4, and the transmission completion time is the time when the data is stored into the data transmission server 34 of the data receiving device 4.

At the next step ST2, the user terminal 11 issues a reservation request for securing the network band and resources on the basis of the material name of the data to be transmitted, the data transmission destination and the transmission completion time, and outputs the reservation request to the transmission side system managing section 12.

At the next step ST3, the transmission side system managing section 12 calculates a network band necessary for transmitting data from the data transmitting device 3 to the data receiving device 4, on the basis of the volume of the data and the transmission completion time designated at step ST1.

At the next step ST4, on the basis of the result of calculation at step ST3, the transmission side system managing section 12 determines that resources in the data transmitting device 3 can be secured when the necessary network band can be secured, and then the processing goes to step ST5. When the necessary network band cannot be secured, the processing goes to step ST16.

At step ST5, the transmission side system managing section 12 issues a reservation request to each piece of equipment so as to operate within such a time that the transmission of data to the data receiving device 4 is completed by the transmission completion time, thus securing the resources. Then, the processing goes to step ST6.

At the next step ST6, the schedule managing section 51 of the data transmission managing device 5 determines whether resources for transmitting data from the data transmitting device 3 to the data receiving device 4 can be secured on the basis of the reservation request from the data transmitting device 3. When the resources can be secured, the schedule managing section 51 proceeds to step ST7. When the resources cannot be secured, the schedule managing section 51 proceeds to step ST15.

At step ST7, the schedule managing section 51 issues a reservation request to each piece of equipment so as to operate within such a time that the transmission of data to the data receiving device 4 is completed by the transmission completion time, thus securing the resources. Then, the processing goes to step ST8.

At the next step ST8, the receiving side system managing section 32 determines whether resources for transmitting data from the data transmitting device 3 to the data receiving device 4 can be secured or not, on the basis of the reservation request from the data transmitting device 5. The receiving side system managing section 32 proceeds to steps ST9 and ST10 when the resources can be secured, and proceeds to step ST14 when the resources cannot be secured.

At step ST9, the user terminal 31 displays the reservation status such as the data and the transmission completion time on the display screen, thus presenting the reservation status to the user.

At step ST10 as a result of determination at step ST8 that the resources can be secured, the receiving side system managing section 32 provides the schedule managing section 51 with information to the effect that the resources in accordance with the reservation request at the data transmitting device 3 can be secured and that the reservation of the resources has been decided. Then, the processing goes to step ST11.

At step ST11, the schedule managing section 51 recognizes the information from the receiving side system managing section 32 to the effect that the reservation of the resources has been decided, and transmits that information to the transmission side system managing section 12. Then, the processing goes to step ST12.

At step ST12, the transmission side system managing section 12 recognizes the information from the schedule managing section 51 to the effect that the reservation of the resources has been decided, and outputs that information to the user terminal 11. Then, the processing goes to step ST13.

At step ST13, on the basis of the information from the transmission side system managing section 12 to the effect that the reservation of the resources has been decided, the user terminal 11 displays on the display screen the information that the reservation of the resources has been decided, in accordance with the reservation request from the user, thus presenting the information to the user.

At step ST14 in the case where the resources in the data receiving device 4 cannot be secured at step ST8, the schedule managing section 51 transmits a request to change the reservation request and then proceeds to step ST15.

At the next step ST15, the transmission side system managing section 12 recognizes the case where the resources cannot be secured at step ST6 or the change request from the receiving side system managing section 32, and releases the resources secured at step ST7. Then, the processing goes to step ST16.

At the next step ST16, the receiving side system managing section 32 recognizes the case where the resources cannot be secured at step ST4 or the change request from the receiving side system managing section 32, and releases the resources secured at step ST5. Then, the processing returns to step ST1.

In the data transmission system 1 which carries out such processing, the necessary network band is calculated by using the data volume and the transmission completion time on the basis of the reservation request, and the resources in the data transmitting device 3, the data transmission managing device 5 and the data receiving device 4 can be secured.

The processing procedure for transmitting data from the data transmitting device 3 to the data receiving device 4 and carrying out accounting at the data transmitting device 3 will now be described with reference to FIG. 4.

Figure 4:
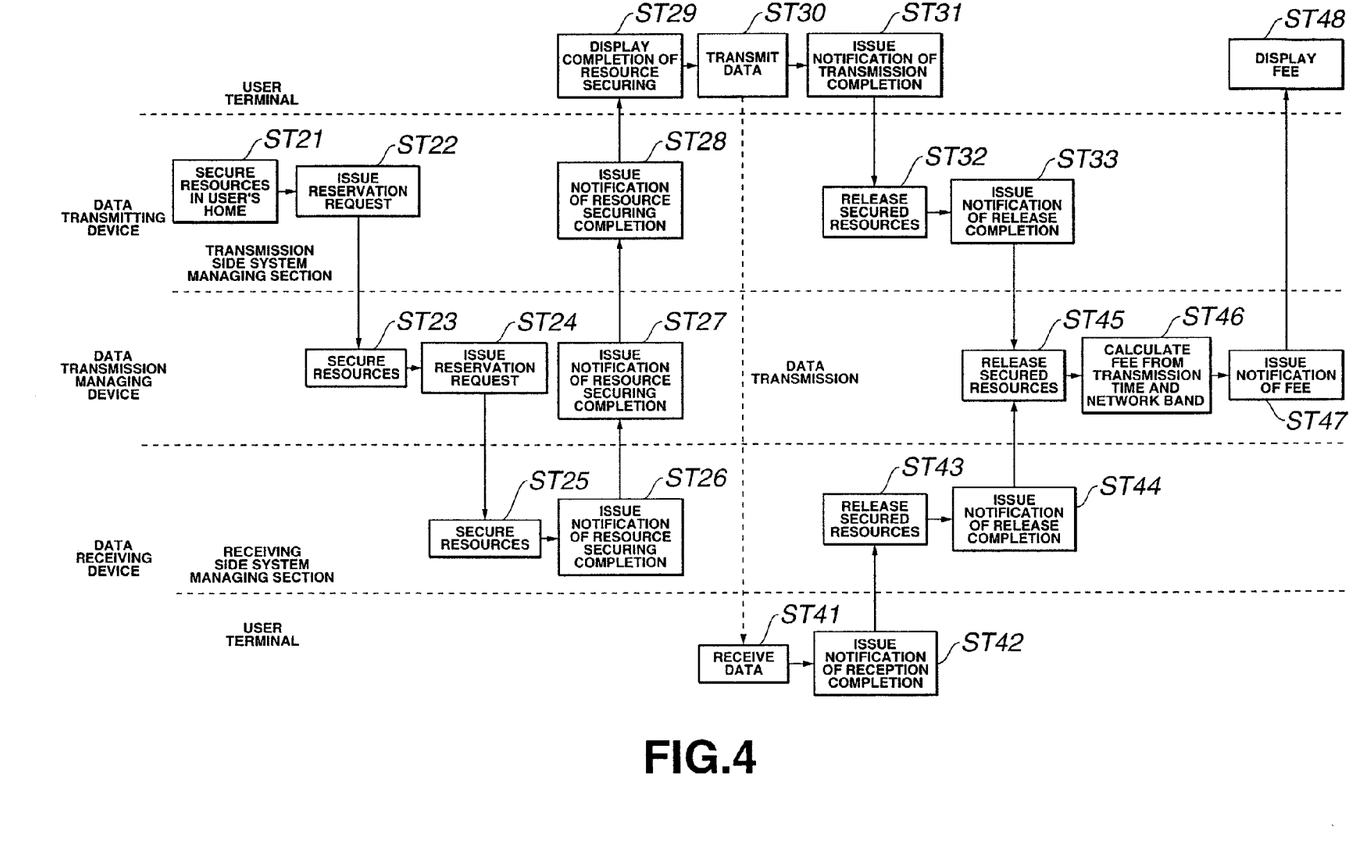
FIG. 4 is a flowchart for explaining the processing procedure for transmitting data from the data transmitting device to the data receiving device and causing the data transmitting device to carry out accounting.

In FIG. 4, first, the transmission side system managing section 12 secures resources in the data transmitting device 3 (step ST21), and transmits a reservation request to the data transmission managing section 5 (step ST22).

Then, the data transmission managing section 5 secures resources in the data transmission managing section 5 in response to the reservation request from the data transmitting device 3 (step ST23), and transmits a reservation request to the data transmitting device 4 (step ST24).

The receiving side system managing section 32 of the data receiving device 4 secures the resources in the data transmission managing device 5 (step ST25), and issues a notification of resource securing completion indicating the completion of resource securing (step ST26).

Then, the data transmission managing device 5 transmits a notification of resource securing completion to the data transmitting device 3 in accordance with the notification of resource securing completion from the data receiving device 4 (step ST27).

The transmission side system managing section 12 of the data transmitting device 3 issues a notification of resource securing completion to the user terminal 11 in accordance with the notification of resource securing completion from the data transmission managing device 5 (step ST28). The user terminal 11 displays the completion of resource securing on the display screen, thus presenting the completion of resource securing to the user (step ST29).

Then, the user terminal 11 controls each section to transmit the data designated by the secured network band (step ST30), and on completion of data transmission, issues and outputs a notification of transmission completion to the transmission side system managing section 12 (step ST31).

Then, the transmission side system managing section 12 controls each section to release the resources secured for data transmission in response to the notification of transmission completion from the user terminal 11 (step ST32), and on cancellation of the reservation of each equipment, transmits a notification of release completion to the data transmission managing device 5 (step ST33).

Meanwhile, at the user terminal 31 of the data receiving device 4 to which the data is transmitted, when the data transmitted to the data transmission server 34 is stored to complete data reception (step ST41), a notification of reception completion is outputted to the receiving side system managing section 32 (step ST42).

The receiving side system managing section 32 controls each section to release the resources secured for data reception (step ST43), and on cancellation of the reservation of each equipment, issues and transmits a notification of release completion to the data transmission managing device 5 (step ST44).

Then, the data transmission managing device 5 controls each section to release the resources secured for transmitting data from the data transmitting device 3 to the data receiving device 4, in accordance with the reception of the notification of release completion from the transmission side system managing section 12 and the notification of release completion from the receiving side system managing section 32 (step ST45).

Figure 5A:
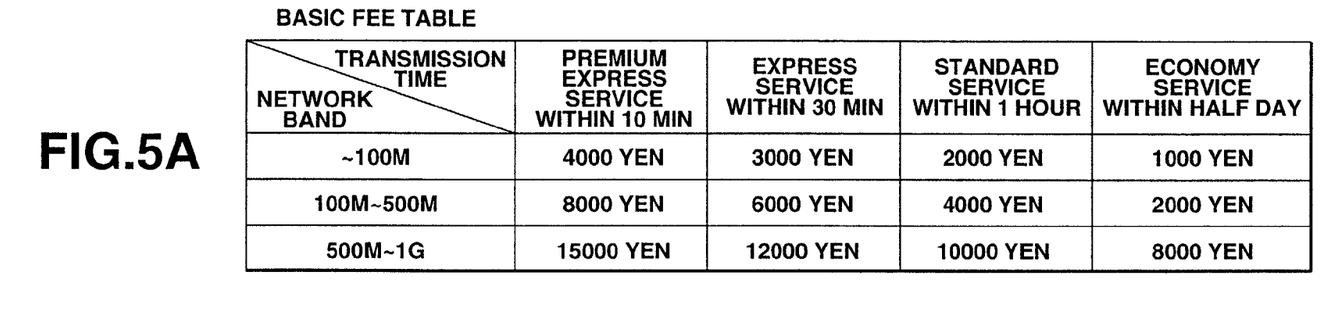
FIG. 5A shows a basic fee table in which the relation between the transmission time and the network band is described.

At the next step ST46, the data transmission managing device 5 calculates the fee to be charged, from the transmission time and the network band required for data transmission from the data transmitting device 3 to the data receiving device 4. In this case, the data transmission managing device 5 holds a table therein and refers to a basic fee table which describes the relation between the transmission time and the network band, as shown in FIG. 5A.

The transmission time is the time obtained by subtracting the transmission start time from the transmission completion time designated by the user. The transmission start time can be designated by the user or calculated from the transmission completion time. When data transmission (step ST30) can immediately be started in response to the issue of the reservation request by the user terminal 11, the transmission time is the time obtained by subtracting the reservation completion time from the transmission completion time.

The data transmission managing device 5 generates accounting information indicating the calculated fee, and issues and transmits a notification of the fee to the user terminal 11 (step ST47). The user terminal 11 displays the notification of the fee from the user transmission managing device 5, thus presenting the accounting information (step ST48).

In the data transmission system 1 which carries out such processing, the reservation of resources in the data transmitting device 3 and the data receiving device 4 is managed by the data transmission managing device 5, and accounting can be carried out on the basis of the transmission time required for transmission and the network band used for transmission.

The processing procedure in the case where the data format must be converted when transmitting data from the data transmitting device 3 to the data receiving device 4 will now be described with reference to FIG. 6.

Figure 6:
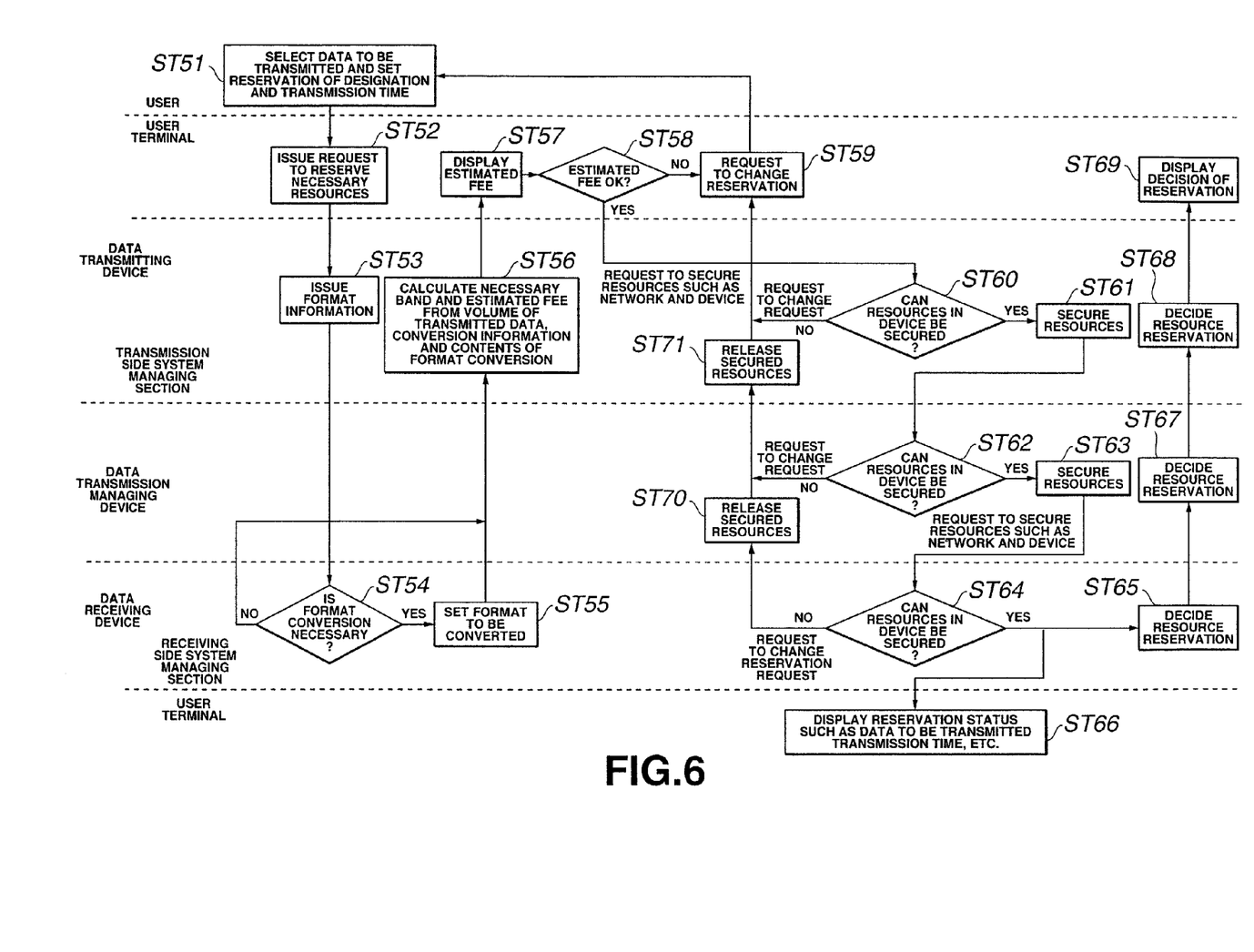
FIG. 6 is a flowchart for explaining the processing procedure when format conversion of data must be carried out when transmitting the data from the data transmitting device to the data receiving device.

In FIG. 6, first, as the user terminal 11 is operated by the user, selection of data to be transmitted and designation of the data transmission destination and the transmission completion time are carried out (step ST51). The data transmission destination is the above-described data receiving device 4, and the transmission completion time is the time when the data is stored into the data transmission server 34 of the data receiving device 4.

Then, the user terminal 11 issues a reservation request for securing a network band and resources on the basis of the material name of the data to be transmitted, the data transmission destination and the transmission completion time, and outputs the reservation request to the transmission side system managing section 12 (step ST52).

The transmission side system managing section 12 generates format information indicating the data format of the data designated at step ST51 and transmits the format information to the receiving side system managing section 32 of the data receiving device 4 (step ST53).

The receiving side system managing section 32 recognizes the data format of the data to be received on the basis of the format information from the transmission side system managing section 12. The receiving side system managing section 32 determines whether or not format conversion must be carried out when receiving the data (step ST54). The receiving side system managing section 32 goes to step ST55 when it is determined that format conversion must be carried out, and goes to step ST56 when it is determined that format conversion need not be carried out.

At step ST55, the receiving side system managing section 32 designates the format to be converted, to an equipment which is included in the data receiving device 4 and carries out format conversion. As the equipment for converting the format, the gateway 35, the ATM I/F 41, the data transmission server 34 for storing data, the VTR unit 36, the server unit 37, and the user terminal 31 may be used. The receiving side system managing section 32 designates the format to be converted, to these equipments.

At step ST56, the transmission side system managing section 12 of the data transmitting device 3 carries out processing to calculate the network band necessary for completion of transmission by the transmission completion time, on the basis of the volume of the data and the transmission completion time designated at step ST51 and the information indicating whether or not format conversion is to be carried out on the side of the data receiving device 4. The transmission side system managing section 12 also carries out processing to calculate the estimated fee necessary for data transmission on the basis of the calculated network band and the type of format conversion carried out on the side of the data receiving device 4.

Figure 5B:
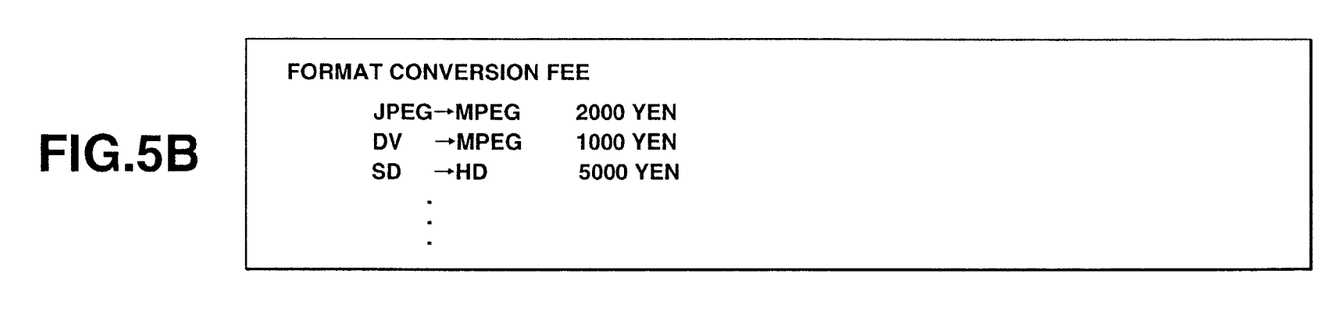
FIG. 5B shows the format conversion fee in accordance with the type of format conversion.

The transmission side system managing section 12 holds tables therein, as shown in FIGS. 5A and 5B. The transmission side system managing section 12 decides the fee on the basis of the network band the transmission time with reference to the basic fee table shown in FIG. 5A, and decides the format conversion fee in accordance with the type of format conversion shown in FIG. 5B. Then, the transmission side system managing section 12 adds these fees to calculate the estimated fee.

Then, the user terminal 11 is supplied with the information indicating the estimated fee calculated at step ST56 and displays the estimated fee, thus presenting the estimated fee to the user (step ST57). The user terminal 11 then determines whether or not data transmission is to be carried out for the presented estimated fee (step ST58). As the user terminal 11 is operated by the user, the user terminal 11 goes to step ST60 when it is determined that data transmission is to be carried out for the presented estimated fee, and goes to step ST59 when it is determined that data transmission is not to be carried out for the presented estimated fee.

At step ST59, the user terminal 11 displays on the display screen the information to the effect that a change of the reservation request is requested, and shifts again to the setting of the reservation request at step ST51.

At step ST60, on the basis of the result of calculation at step ST56, when the necessary network band can be secured, the transmission side system managing section 12 determines that the resources in the data transmitting device 3 can be secured, and then proceeds to step ST61. When the necessary network band cannot be secured, the transmission side system managing section 12 returns to step ST59.

Then, the transmission side system managing section 12 issues a reservation request to each piece of equipment so as to operate within such a time that transmission of data to the data receiving device 4 is completed by the transmission completion time, thus securing the resources (step ST61).

The schedule managing section 51 determines whether resources for transmitting data from the data transmitting device 3 to the data receiving device 4 can be secured or not, on the basis of the reservation request from the data transmitting device 3 (step ST62). The schedule managing section 51 goes to step ST63 when the resources can be secured, and goes to step ST71 when the resources cannot be secured.

The schedule managing section 51 issues a reservation request to each piece of equipment so as to operate within such a time that data transmission to the data receiving device 4 is completed by the transmission completion time, thus securing the resources (step ST63).

Then, the receiving side system managing section 32 determines whether resources for transmitting data from the data transmitting device 3 to the data receiving device 4 can be secured or not, on the basis of the reservation request from the data transmission managing device 5 (step ST64). The receiving side system managing section 32 goes to step ST66 when the resources can be secured, and goes to step ST70 when the resources cannot be secured.

The user terminal 31 displays on the display screen the reservation status such as the data to be transmitted to the user on the side of the data transmission managing device 5 and the transmission completion time, thus presenting the reservation status to the user (step ST66).

At steps ST65 to ST68 in the case where it is determined at step ST64 that the resources can be secured, the resources in accordance with the reservation request from the data transmitting device 3 can be secured in the receiving side system managing section 32, the schedule managing section 51 and the transmission side system managing section 12, and the user terminal 11 is notified of the decision of reservation of the resources. Then, the processing goes to step ST69.

At the next step ST69, on the basis of the information from the transmission side system managing section 12 to the effect that the resources is decided, the user terminal 11 displays on the display screen the information to the effect that the reservation of the resources is decided in accordance with the reservation request from the user, thus presenting that information to the user.

At step ST70 in the case where the resources in the data receiving device 4 cannot be secured at step ST64, the schedule managing section 51 transmits a request to change the reservation request to the transmission side system managing section 12 and then proceeds to step ST71.

The schedule managing section 51 recognizes the case where the resources cannot be secured at step ST64 or the change request from the receiving side system managing section 32, and releases the resources secured at step ST63. Then, the processing goes to step ST71.

At the next step ST71, the receiving side system managing section 32 recognizes the case where the resources cannot be secured at step ST62 or the change request from the receiving side system managing section 32, and releases the resources secured at step ST61. Then, the processing returns to step ST59.

In the data transmission system 1 which carries out such processing, even when format conversion must be carried out in the data receiving device 4 in accordance with the format of the data to be transmitted from the transmission side system managing section 12, the network band can be determined in consideration of the time required for format conversion processing. Therefore, data transmission to the data receiving device 4 can be completed more securely by the transmission completion time designated by the user.

Also, in the data transmission system 1, even when format conversion must be carried out, the estimated fee in accordance with the type of format conversion carried out in the data receiving device 4 can be presented to the user since the tables as shown in FIGS. 5A and 5B are held in the transmission side system managing section 12.

The above-described format conversion need not necessarily be carried out in the data receiving device 4 and may be carried out in the data transmission managing device 5. In this case, the processing of steps ST54 and ST55 is carried out in the data transmission managing device 5, and the transmission side system managing section 12 decides the network band and the estimated fee in accordance with the format conversion carried out in the data transmission managing device 5.

Figure 7:
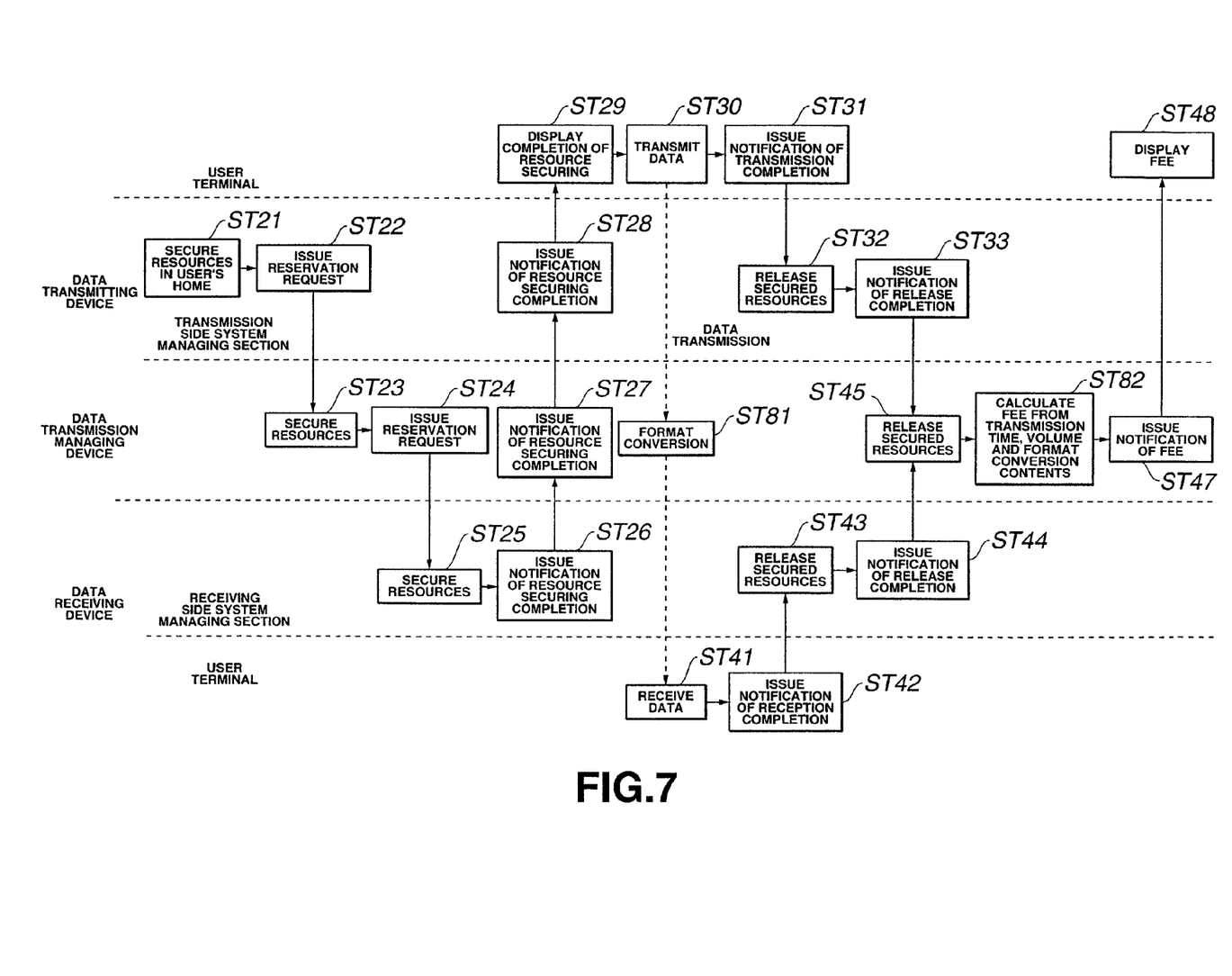
FIG. 7 is a flowchart showing the processing procedure when the data transmission managing device carries out accounting after carrying out format conversion and transmitting data from the data transmitting device to the data receiving device.

The processing procedure for carrying out accounting in the data transmission managing device 5 after transmitting the data of the converted format to the data transmitting device 3 to the data receiving device 4 will now be described with reference to FIG. 7. In the description of FIG. 7, the same processing contents as those in FIG. 4 are denoted by the same step numbers and will not be described further in detail.

In FIG. 7, the processing of steps ST21 to ST29 similar to the processing described in FIG. 4 is carried out, thus securing the resources in the data transmitting device 3, the data receiving device 4 and the data transmission managing device 5, which constitute the data transmission system 1, in accordance with the reservation request.

As data transmission from the user terminal 11 is carried out and the data is transmitted to the data transmission managing device 5 in the state where the resources are secured, the data transmission managing device 5 carries out format conversion and transmits the data of the converted format to the data receiving device 4 (step ST81).

The user terminal 31 of the data receiving device 4 receives the data of the converted format (step ST41). Then, the data transmitting device 3 carries out the processing of steps ST30 to ST33, thus transmitting a notification of release completion to the data transmission managing device 5. The data receiving device 4 carries out the processing of steps ST42 to ST44, thus transmitting a notification of release completion to the data transmission managing device 5.

Then, the data transmission managing device 5 releases the secured resources (step ST45), and calculates the fee to be charged to the data transmitting device 3 on the basis of the transmission time, the network band and the contents of the format conversion carried out at step ST81. In this case, the data transmission managing device 5 calculates the fee with reference to the tables as shown in FIGS. 5A and 5B (step ST82). Then, the data transmission managing device 5 generates accounting information indicating the calculated fee and issues and transmits a notification of the fee to the user terminal 11 (step ST47). The user terminal 11 displays the notification of the fee from the data transmission managing device 5, thus presenting the accounting information (step ST48).

In the data transmission system 1 which carries out such processing, even in the case where the data of the converted format is transmitted from the data transmitting device 3 to the data receiving device 4, accounting can be carried out on the basis of the contents of format conversion.

The above-described format conversion need not be necessarily carried out in the data transmission managing device 5 and may be carried out in the data receiving device 4. In this case, the processing of step ST82 is carried out in accordance with the contents of the format conversion carried out in the data receiving device 4.

As described above, in the data transmitting device and method according to the present invention, a network band necessary for transmitting data is calculated on the basis of the data quantity of data to be transmitted to the data transmission destination and the transmission completion time indicating the time of completion of data transmission to the data transmission destination, and the stored data is transmitted to the data transmission destination by using the calculated network band. Thus, data transmission can be started at such a start time that data transmission to the data transmission destination can be done by the transmission completion time, and the data transmission completion time can be designated in advance for carrying out data transmission.

Also, in the data transmission managing device and method according to the present invention, a network band can be secured on the basis of a request to secure a network band necessary for transmitting data from the data transmitting device to the data receiving device. Thus, by starting data transmission at such a start time that data transmission to the data transmission destination can be done by the transmission completion time, the data transmission completion time can be designated in advance for carrying out data transmission.

Although the present invention has been described with reference to specific embodiments, those of skill in the art will recognize that changes may be made without departing from the spirit and scope of the invention as set forth in the hereafter appended claims.

The invention claimed is:

1. A data transmitting device, comprising:
   a data transmitting part for transmitting data to a data transmission destination via an external communication channel;
   a data storage part for storing the data transmitted byte data transmitting part;
   an arithmetic part for calculating a network band for use when the data transmitting part transmits the data, based on a data quantity of the data stored in the data storage part and to be transmitted by the data transmitting part and further based on a transmission completion time indicating a designated time of completion of data transmission of the data to the data transmission destination;
   an accounting part for generating accounting information based on the basis of the network band calculated by the arithmetic part and a transmission time at the data transmitting part; and
   a transmission control part for controlling the data transmitting part to transmit the data stored in the data storage part to the data transmission destination using the network band calculated by the arithmetic part and to complete the data transmission to the data transmission destination by the transmission completion time, and for controlling the accounting part to generate the accounting information;
   wherein the transmission control part reserves reservation data of both the data transmitting part and the data storage part based on a reservation status of both the data transmitting part and the data storage part, and transmits the reservation data to the data transmission destination by the transmission completion time.

2. A data transmitting device as claimed m claim 1, wherein the transmission control part changes the reservation data at both the data transmitting part and the data storage part on the basis of the reservation status of the data transmission destination.

3. A data transmitting device as claimed in claim 1, wherein the transmission control part generates format information of the data to be transmitted from the data transmitting part to the data transmission destination and transmits the format information to the data transmission destination, and wherein the accounting part generates accounting information based on the contents of format conversion at the data transmission destination.

4. A data transmitting device as claimed in claim 1, wherein the arithmetic part calculates the network band based on format conversion data at the data transmission destination.

5. A data transmitting method, comprising the steps of:
   calculating a network band for transmitting data based on a data quantity of data to be transmitted to a data transmission destination, and further based on a transmission completion time indicating a designated time of completion of data transmission of the data to the data transmission destination;
   transmitting the data to the data transmission destination by using the calculated network band; and
   generating accounting information based on both the network band and a period of time between a requesting time and the transmission completion time, wherein the requesting time is based on a time when the designated time of completion is designated.

6. A data transmitting method as claimed in claim 5, wherein a data transmitting device and a data storage section are reserved based on a reservation status of both the data transmitting device and the data storage device, and the data is transmitted to the data transmission destination by the transmission completion time.

7. A data transmitting method as claimed in claim 6, wherein reservation data at both the data transmitting device and the data storage device are changed based on the reservation status of the data transmission destination.

8. A data transmitting method as claimed in claim 5, wherein format information of the data to be transmitted to the data transmission destination is generated and transmitted to the data transmission destination, and wherein accounting information is generated based on contents of format conversion at the data transmission destination.

9. A data transmitting method as claimed in claim 5, wherein the network band is calculated based on contents of format conversion carried out at the data transmission destination.

10. A data transmission managing device, comprising:
  a communication part connected with a data transmitting device and a data receiving device via a communication channel;
  a communication control part for securing a network band for the communication part based on a request from the data transmitting device which secures network band for transmitting data to the data receiving device; and
  an arithmetic part for controlling the communication part to generate accounting information, based on the network band determined from a data quantity of the data to be transmitted from the data transmitting device to the data receiving device and also based on a period of time between a requesting time and a transmission completion time indicating a designated time of completion of data transmission of the data to the data transmitting device, wherein the requesting time is based on a time when the designated time of completion is designated, and transmission time when the data is transmitted from the data transmitting device to the data receiving device by using the network band, and to transmit the accounting information to the data transmitting device.

11. A data transmission managing device as claimed in claim 10, further comprising;
  a format converting part for carrying out format conversion of the data transmitted from the data transmitting device, wherein the arithmetic part generates accounting information based on contents of format conversion at the format conversion means.

12. A data transmission managing method, comprising the steps of:
  securing a network band based on a request to secure a network band for transmitting data from a data transmitting device to a data receiving device; and
  generating accounting information based on the network band determined from a data quantity of the data to be transmitted from the data transmitting device to the data receiving device and based on a transmission completion time indicating a designated time of completion of data transmission of the data to the data transmitting device, and a period of time between a requesting time and the transmission completion time, wherein the requesting time is based on a time when the designated time of completion is designated, and a transmission time when the data is transmitted from the data transmitting device to the data receiving device by using the network band.

13. A data transmission managing method as claimed in claim 12, wherein format conversion is performed on the data transmitted from the data transmitting device, and accounting information is generated based on contents of forming conversion.

* * * * *